July 19, 1955　　　H. E. CANN, SR., ET AL　　　2,713,251
BULK MILK COOLER
Filed May 11, 1954　　　　　　　　　　　　　　3 Sheets-Sheet 1
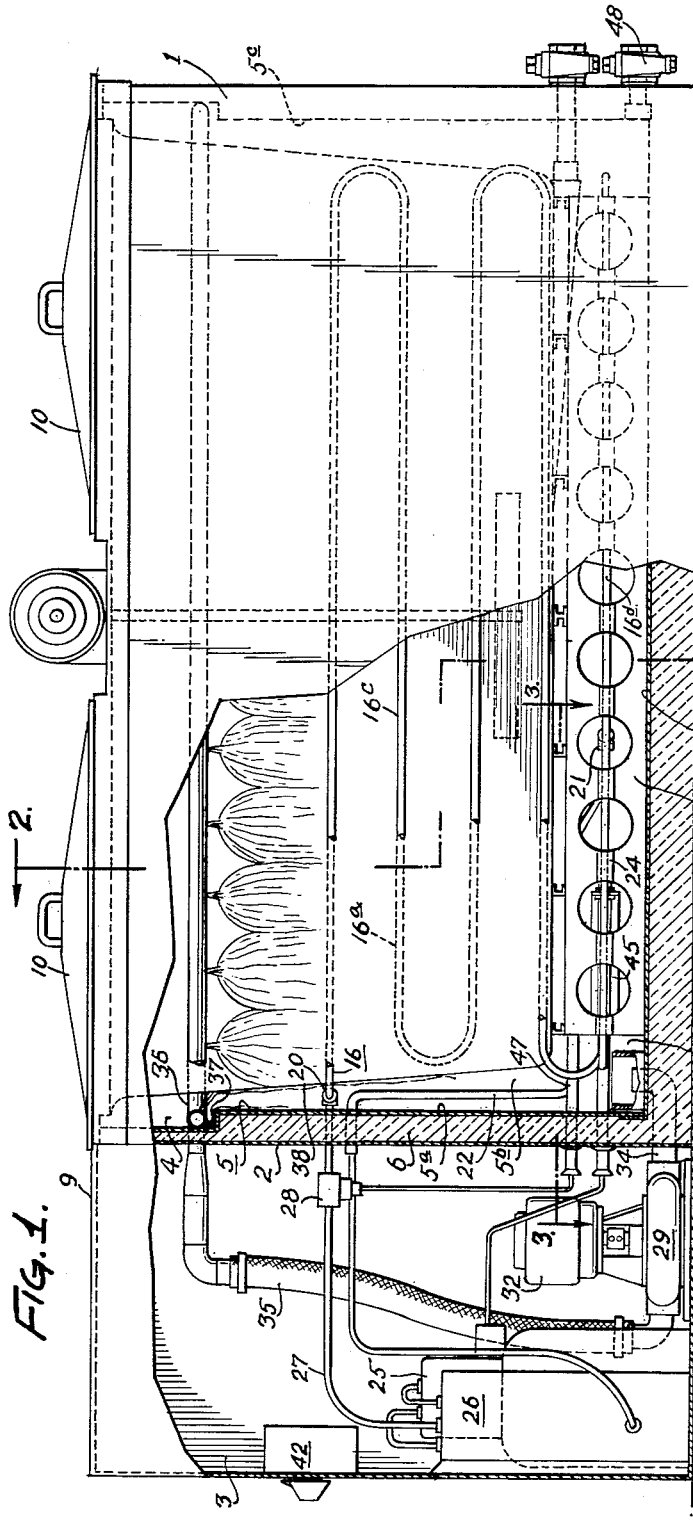
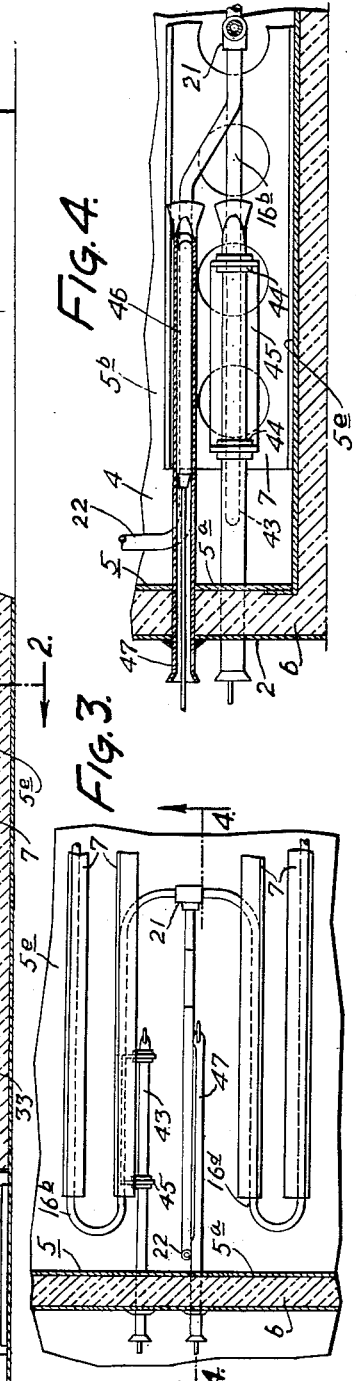
Inventors:
Harry E. Cann Sr.
Merritt B. Cann
by their Attorneys
Howson & Howson

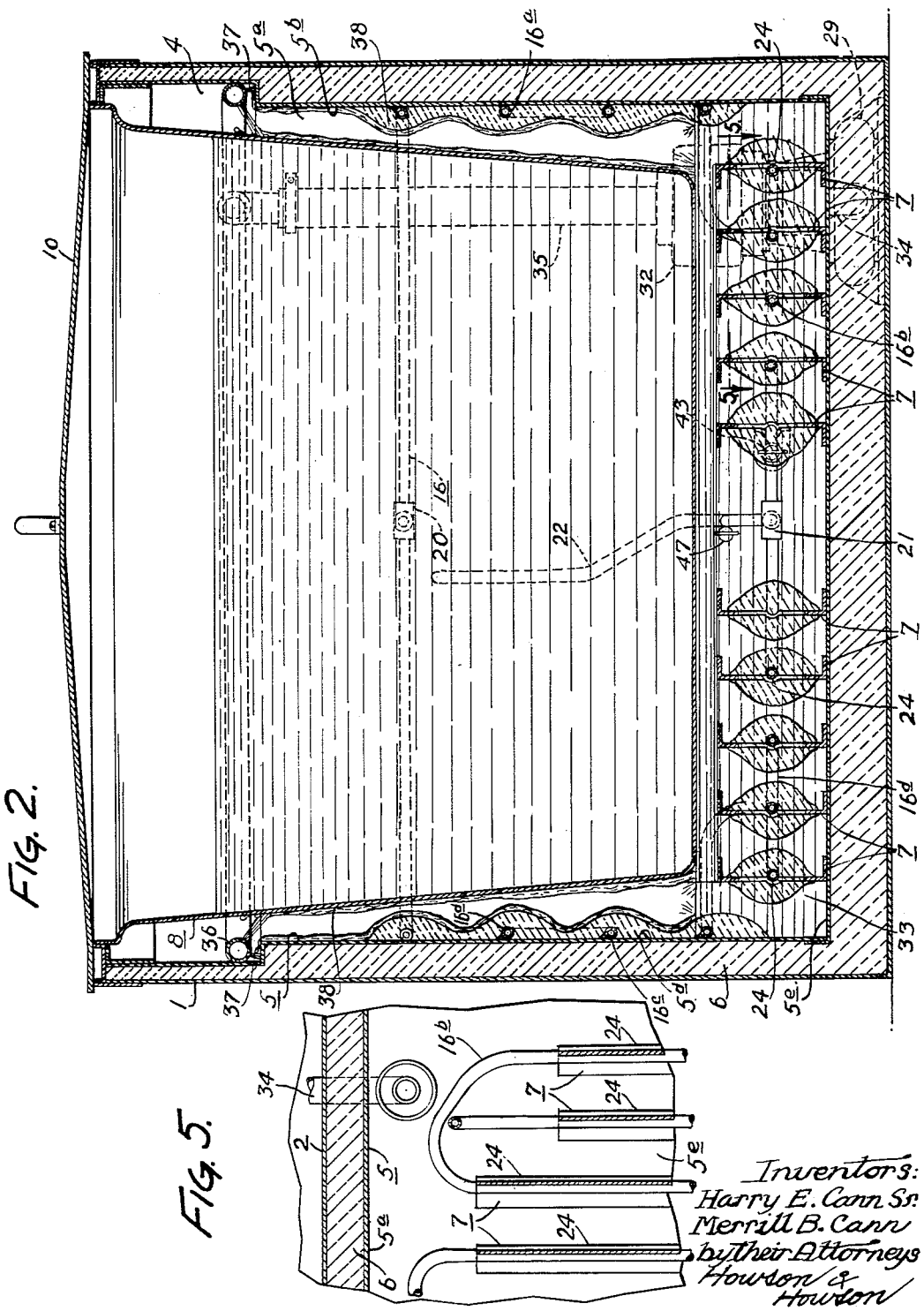

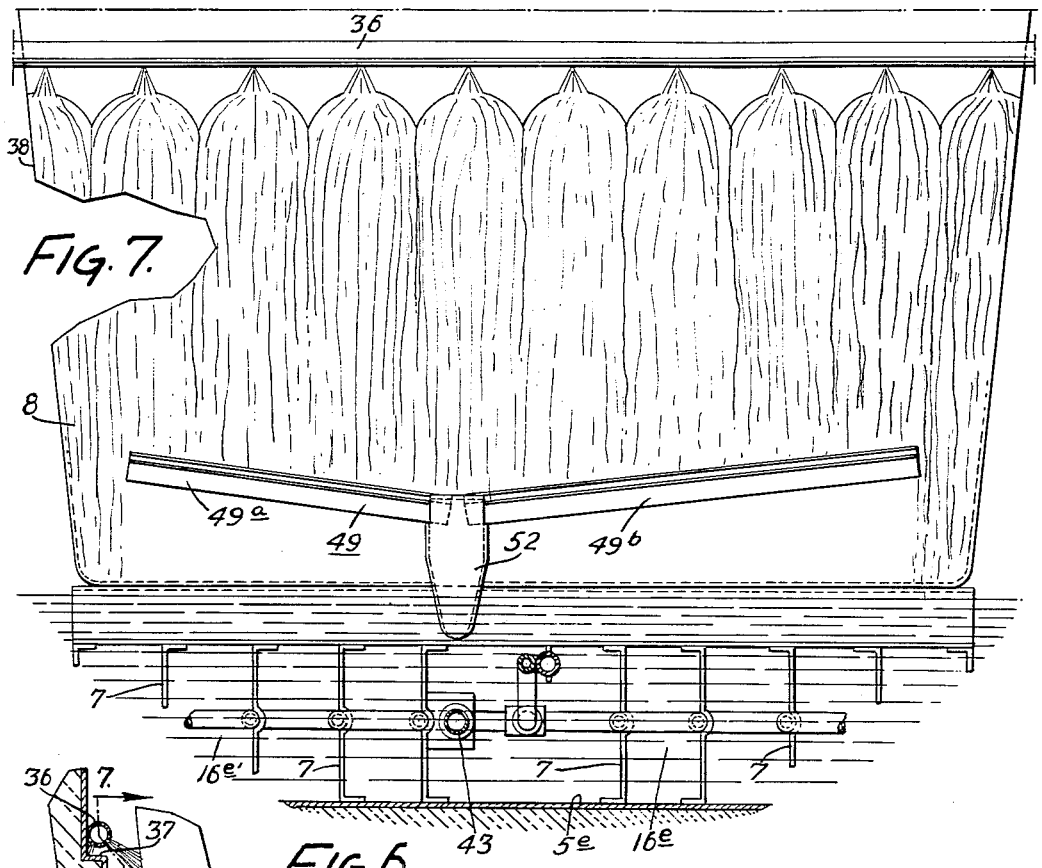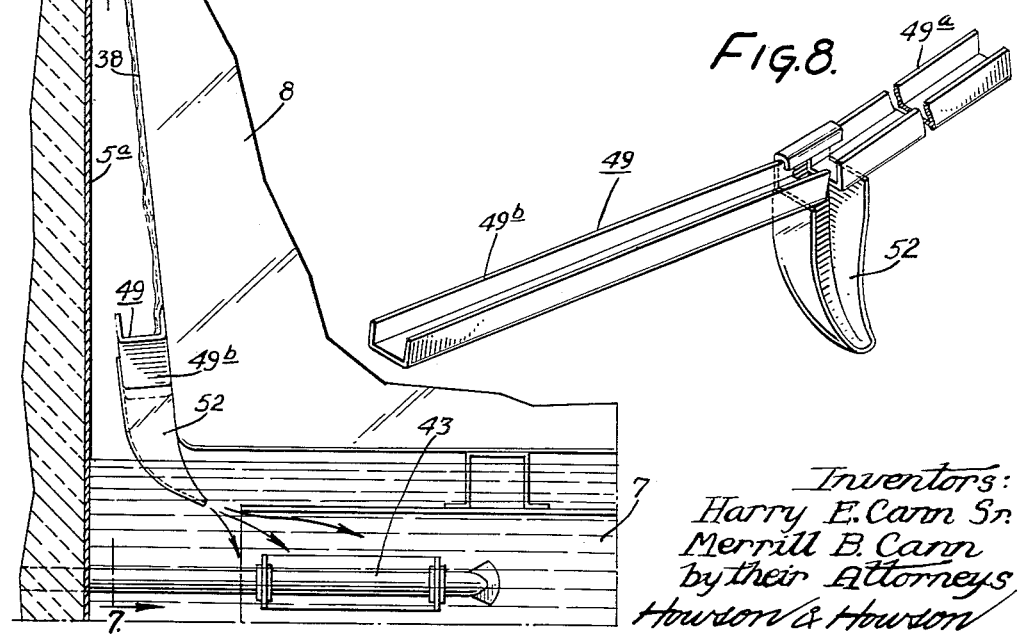

2,713,251

BULK MILK COOLER

Harry E. Cann, Sr., and Merrill B. Cann, West Chester, Pa., assignors to Esco Cabinet Company, West Chester, Pa., a corporation of Pennsylvania Application May 11, 1954, Serial No. 429,066

7 Claims. (Cl. 62—4)

This invention relates to milk coolers and more particularly to milk coolers of the bulk tank type.

The present invention is primarily directed to a milk cooler of the stated character in which a secondary liquid medium is flushed down over the exterior walls of a tank containing milk in bulk to afford rapid reduction in the temperature thereof from body heat to the vicinity of 40° F. in a relatively short period of time, and the maintenance of this reduced temperature despite the depositing in the tank from time to time of additional quantities of body temperature milk.

The invention contemplates essentially the provision of a milk cooler having a secondary heat exchange system wherein the secondary medium is directed to flow both over the external surfaces of the bulk tank and over the interior surfaces of the cabinet itself, on which surfaces are mounted refrigerant coils of the primary system. An operating cycle has been devised which will permit the formation of an ice bank on the walls of the cabinet adjacent the primary coils, which ice bank is stripped from these walls by the secondary medium warmed by contact with the milk-bearing tank.

The cycle of operations of the pump, the compressor and the expansion valve of the primary system is controlled and arranged so that the optimum temperature conditions can be maintained at all times in the bulk tank, regardless of the initial milk temperature and the time interval between milk deposits.

A principal object of the invention, therefore, is to provide a milk cooler in which the optimum temperature for storage of milk can readily be maintained.

A further object of the invention is to provide in a milk cooler of the stated character, means by which heat from milk is absorbed directly by a primary refrigerant system, by a secondary liquid medium and by the melting of a preformed ice bank.

A further object of the invention is to provide a milk cooler of the stated type wherein the temperature responsive means controlling the operation of the primary system is positioned to control the formation of the ice bank and is directly affected by the secondary medium warmed by contact with milk at body temperature.

A final object of the invention is to provide a milk cooler of the primary-secondary heat exchange type wherein the sensing means for the expansion valve of the primary system is arranged to respond rapidly to the needs of the system and to afford a steady mean storage temperature.

The invention resides further in certain structural details hereinafter described and illustrated in the attached drawings wherein:

Fig. 1 is an elevational view partly in section of the preferred form of the invention;

Fig. 2 is a view taken substantially on line 2—2 of Fig. 1;

Fig. 3 is a view taken substantially on line 3—3 of Fig. 1;

Fig. 4 is a view taken substantially on line 4—4 of Fig. 3;

Fig. 5 is a view taken substantially on line 5—5 of Fig. 2;

Fig. 6 is a fragmentary view of a modified form of the invention;

Fig. 7 is a view taken substantially on line 7—7 of Fig. 6; and,

Fig. 8 is a view in perspective of the gutter and spout arrangement of Figs. 6 and 7.

With reference to the drawings and more particularly to Figs. 1 and 2, the illustrated embodiment of the invention comprises a cabinet having an outer shell 1, and a partition wall 2 dividing the cabinet into a minor compartment 3, in which are positioned the customary constituents of a refrigerating system, and a major compartment 4 having a liner 5 positioned in spaced relation to the shell 1 and the wall 2. Suitable insulation 6 is positioned between the liner, the outer shell, and wall 2 to reduce the passage of extraneous heat into the major compartment to a minimum. Mounted within the major compartment on the support members 7 in proximate spaced relation to the liner is a container 8 for the reception of milk in bulk form. Access to this tank is afforded by lids 10, which with top wall 9 completes the enclosure of the cabinet. The liner 5 comprises an end wall 5a, side wall 5b, end wall 5c, side wall 5d, and bottom wall 5e.

The primary refrigeration system used in the milk cooler of the present invention is of standard construction and the compressor is indicated generally by the reference numeral 25. Refrigerant, such as Freon, or the like, is forced from the compressor to the condenser 26 and from thence by means of the conduit 27 to the expansion valve 28 and expansion coil 16. The coil 16 comprises generally two parallel sections extending from a T-fitting 20 to either side of the major compartment. In particular, one section 16a of this coil is bonded to the liner wall 5b and is connected in series to a section 16b which is bonded to the support members 7 approximately midway of their heighths. Similarly, a coil section 16c is bonded to the liner wall 5d and is connected in series to coil section 16d, secured to the support members 7 at the opposite side of the major compartment. The ends of the coil sections 16b and 16d are connected to a T-fitting 21 from whence the refrigerant flows by means of a suitable conduit 22 back to the primary refrigeration apparatus.

The secondary refrigerant system includes a pump 29 actuatable by a motor 32. A quantity of secondary refrigerant is normally maintained in the sump 33 at the bottom of the major compartment 4. The secondary liquid is drawn from the sump by the pump 29 through a pipe 34 and forced by way of a conduit 35 into a tubular manifold 36 which is secured to the side and end walls of the major compartment above the step 37. This manifold 36 is provided with two radially spaced series of longitudinally spaced apertures arranged to direct the secondary medium against the sides 38 of the bulk milk tank 8 and against the step 37 so that a portion flows down over the coil sections bonded to the walls of the liner.

The flow of the secondary medium may be controlled so that an ice bank of predetermined thickness can be formed on the liner walls adjacent the coil sections to attain a high degree of uniformity of cooling. A time switch 42, shown schematically in Fig. 1, may be set so that the pump 29 will operate for only a predetermined period of time. It will be understood that the control of the secondary medium is independent of the control of the primary system. The compressor 25 of the primary system is responsive only to temperature and is started and stopped by means of a bulb 43, mounted by means of rubber grommets 44 in a U-shaped bracket 45 secured to the side of one of the support members 7 in spaced relation to the innermost run of coil section 16b. It will be apparent that accurate regulation of the compressor is possible because of the proximity of the bulb 43 to the liquid flowing from sides of the bulk milk tank. Its position not only controls the amount of ice built up on the runs of the coil sections 16b and 16d, but also on the other coil sections. For example, ice would first form on the walls 5a and 5d in the vicinity of the runs of the coil sections 16b and 16d simultaneously. Since ice will form last on the coil sections beneath the bulk tank and then envelop the bulb 43, the compressor will remain operative until this takes place. In this manner, very accurate control over the compressor operation is attained. This particular relation of bulb 43 with respect to the bottom of the liner and the normal level of secondary medium is extremely important to attainment of uniform regulation of the compressor and to prevent the complete freezing over of the liquid in the sump.

A bulb 46 controls the operation of the expansion valve 28 and permits the expansion of more or less refrigerant in the primary system as required. This bulb is arranged in a shell 47 which is secured in heat conductive relation to the common hot gas line within the major compartment so as to be responsive thereto and to the temperature of the liquid in the sump in which the bulb 46 is immersed, as clearly shown in Fig. 2.

In operation, the sump drain valve 48 is closed and the sump is filled with sufficient secondary liquid medium, preferably to the level shown in Fig. 2. The compressor 25 is then turned on by means of a suitable switch (not shown) and the timer 42 is set to start operation of the pump 29 so that the secondary medium will be sprayed onto the side walls of the liner to form a sheet of ice thereon which eventually will reach the thickness of about 1½". The dairyman may set the timer for a part load for one milking, if desired, to cause the pump 29 to operate for a sufficient length of time to accommodate the normal quantity of milk from each milking. As the heat is removed from the secondary refrigerant, the expansion valve 28 tends to restrict the flow of refrigerant to the coil sections in response to the bulb 46. At this time, the ice bank on the walls and the coil section 16b and 16d will have been built up to the desired thickness and likewise the ice will have almost enveloped the bulb 43. After the operation of the pump 29 has been terminated by the action of the timer 42 at the end of the set interval the compressor 25 continues to operate until the bulb 43 is completely enveloped. Since heat leakage from the ambient air is inevitable, the compressor will continue to operate intermittently to maintain the ice bank on the several coil sections. The time of this continued operation will vary depending upon the amount of insulation employed and other design characteristics, and will occur despite the fact that the milk tank is empty.

When the bulk milk which normally has a temperature of about 90° F., is deposited in the tank, the dairyman again sets the timer which actuates the pump 29 for a predetermined interval during which the secondary liquid is sprayed both over the walls of the milk tank and against the side walls of the liner as shown clearly in Fig. 1. The heat from the milk warms the secondary liquid so that the flow thereof over the side walls rapidly strips the ice from these walls so that it falls in slabs either against the bulk tank or into the sump. This stripping action forms an important part of the present invention, in that the advantages both of mechanical and ice refrigeration are obtained by the consequent flow of liquid over the bare liner walls and over both sides of the ice slabs. Constant recirculation of the liquid swiftly reduces the temperature of the milk. After a short period of operation in this manner under heat load, the bulb 43 is uncovered and the compressor 25 is reactuated. During the interval between the starting of the pump and the starting of the compressor, the liquid reaches its maximum temperature of about 43° F. and all the ice in the cabinet is melted. Both the compressor and the pump continue to operate so that the ice begins to build up inside the cabinet as soon as the temperature of the liquid has reached approximately 39° F. During this period of operation the bulb 46 maintains the expansion valve 28 in a fully open position to assure maximum flow of refrigerant. The new layer of ice continues to build up on the side walls and the bottom coil sections until the bulb 46 is again covered. During the time of storage of the chilled milk, the compressor operates as required to compensate for heat leakage and uniformity of refrigeration as well as stability of control is achieved. Since the operation of the pump is controlled by the timer 42, formation of ice is terminated on the expiration of the set time. Additional milk may thereafter be added at any time. In that event the timer is reset and the stripping operation is repeated.

The above described control system cooperates particularly with the secondary heat exchange system effectively to cool in a brief time relatively large quantities of milk. This result is attained because of the heat absorbed simultaneously by the secondary liquid flowing over the walls of the milk tank during the predetermined interval of pump operation, by the primary refrigerant coils, and by the melting of the ice slab, after the latter has been stripped from the coils.

In Figs. 6 and 7 a modified form of the invention is disclosed wherein a gutter or a trough 49 comprising two downwardly and inwardly inclined sections 49a and 49b are attached to one end of the bulk tank. Liquid flowing down the walls of the bulk tank flows into these trough sections and thence into the spout 52 from which it flows into the immediate vicinity of the control bulb 43. In this manner, the bulb becomes increasingly sensitive to the liquid flowing directly from the walls of the milk container, the time interval between the initial stripping of the ice slabs and the commencing of operation of the compressor is shortened, and the operation of the compressor is controlled with a high degree of accuracy to reduce swiftly the temperature of the milk.

We claim:

1. In a cooling apparatus for liquids, the combination comprising an open top cabinet having a wall portion surrounding the liquid-containing space to be cooled, a container for the liquid to be cooled mounted within said wall portion and having its peripheral wall portions closely surrounded by the peripheral wall of said cabinet and a top opening underlying the open top of said cabinet, a sump in said cabinet beneath the bottom wall of said container, means associated with said sump for impelling water from said sump to other portions of the interior of said container, said means including a conduit having outlets directed against an upper part of the interior of the wall portion of the cabinet to flush said wall portion, refrigerant circulating conduit means mounted in closely coupled freezing relation to said flushed wall portion to freeze liquid flushed thereover, and means for passing refrigerant through said refrigerant circulating conduit means to freeze liquid on said vertical wall portion, whereby water first flushed against said wall portion operates to remove into said sump ice previously formed against said wall portion, and water flushed against said wall portion in continued operation is frozen to form a fresh layer of ice against said vertical wall portion as the operation of cooling and flushing progresses toward completion.

2. In a cooling apparatus for liquids, the combination comprising an open top cabinet having a wall portion surrounding the liquid-containing space to be cooled, a container for the liquid to be cooled mounted within said wall portion and having its peripheral wall portions closely surrounded by the peripheral wall of said cabinet and a top opening underlying the open top of said cabinet, a sump in said cabinet beneath the bottom wall of said container, means associated with said sump for impelling water from said sump to other portions of the interior of said container, said means including a conduit having outlets directed against an upper part of the interior of the wall portion of the cabinet to flush said wall portion and other outlets directed inwardly against the outer surface of said container, refrigerant circulating conduit means mounted in closely coupled freezing relation against the interior of said flushed wall portion to freeze liquid flushed thereover, and means for passing refrigerant through said refrigerant circulating conduit means to freeze liquid on said vertical wall portion, whereby water first flushed against said wall portion operates to remove into said sump ice previously formed against said wall portion, and water flushed against said wall portion in continued operation is frozen to form a fresh layer of ice against said vertical wall portion as the operation of cooling and flushing progresses toward completion.

3. In a milk cooler, a cabinet having exterior side and end walls and a bottom wall and a top wall and a partition dividing the interior thereof into a major compartment and a minor compartment, a liner disposed in said major compartment in spaced relation to said walls and said partition, said liner having side and end walls and a bottom wall, insulation disposed between said liner and said exterior walls and said partition, a container arranged in said major compartment in proximate spaced relation to said liner for the reception of milk in bulk form, a sump in the bottom of said major compartment, a primary refrigeration system including a compressor and a condenser positioned in said minor compartment, and an evaporator coil having sections arranged in series on each of said side walls and coil sections disposed substantially midway between the bottom of said container and the bottom wall of said liner, a secondary refrigerant system operative to direct liquid cooling medium over the walls of said liner and said container to form an ice bank on said liner walls, timing means to control the flow of secondary refrigerant as required, and temperature responsive means mounted in said sump in spaced relation to said bottom evaporator coil section, said temperature responsive means being operatively connected to said compressor to control the starting and stopping thereof.

4. In a milk cooler, a cabinet having exterior side and end walls, a bottom wall and a top wall and a partition dividing the interior thereof into a major compartment and a minor compartment, a liner disposed in said major compartment in spaced relation to said walls and said partition, said liner having side and end walls and a bottom wall, insulation disposed between said liner and said exterior walls and said partition, a container arranged in said major compartment in proximate spaced relation to said liner for the reception of milk in bulk form, a sump in the bottom of said major compartment, a primary refrigeration system including a compressor and a condenser positioned in said minor compartment and an evaporator coil having sections secured to each of said side walls of said liner, and coil sections disposed between the bottom of said container and the bottom wall of said liner, a secondary refrigerant system operative to direct liquid cooling medium over the walls of said liner and said container to form an ice bank on said liner walls, timing means to control the flow of secondary refrigerant as required, said secondary system including a pump and a manifold to receive liquid from the pump, said manifold having a plurality of apertures to direct the said medium over the liner walls and the outer surface of said container, and temperature responsive means mounted in said sump in spaced relation to said bottom evaporator coil sections, said temperature responsive means being operatively connected to said compressor to control the starting and stopping thereof.

5. A milk cooler according to claim 4 wherein further temperature responsive means are mounted in said major compartment in proximate relation to the end of said evaporator coil, said last-named temperature responsive means being operative to control the flow of refrigerant into said evaporator coil.

6. In a cooling apparatus for liquids, the combination comprising a cabinet having a vertically extending wall portion adjacent the liquid-containing space to be cooled, means for mounting a container for the liquid to be cooled adjacent said wall portion, a sump in said cabinet, means associated with said sump for impelling water from said sump to other portions of the interior of said container, said means including a conduit having outlets directed against a container mounted adjacent said wall to flush the outer surface of said container and extract heat therefrom, and outlets directed against the upper portion of said wall, refrigerant circulating conduit means mounted in closely coupled freezing relation to said flushed wall portion to freeze liquid flushed thereover, refrigerant circulating conduit means also mounted within said sump, means for passing refrigerant through said refrigerant circulating conduit means in closely coupled freezing relation to said flushed wall portion and said refrigerant circulating conduit means within said sump, a thermostat mounted within said sump, means controlled by said thermostat to control the refrigerating action within said refrigerant circulating conduit means, means for collecting water flowing down the outer wall of said container and means for directing said collected water as a concentrated stream in heat exchange relation with said thermostat, whereby said thermostat operates rapidly to initiate the refrigerating action upon starting of the flushing of said cabinet wall and container by water.

7. In a cooling apparatus for liquids, the combination comprising a cabinet having a vertically extending wall portion adjacent the liquid-containing space to be cooled, means for mounting a container for the liquid to be cooled adjacent said wall portion, a sump in said cabinet, means associated with said sump for impelling water from said sump to other portions of the interior of said container, said means including a conduit having outlets directed against a container mounted adjacent said wall to flush the outer surface of said container and extract heat therefrom, and outlets directed against the upper portion of said wall, refrigerant circulating conduit means mounted in closely coupled freezing relation to said flushed wall portion to freeze liquid flushed thereover, refrigerant circulating conduit means also mounted within said sump, means for passing refrigerant through said refrigerant circulating conduit means in closely coupled freezing relation to said flushed wall portion and said refrigerant circulating conduit means within said sump, a thermostat mounted within said sump, means controlled by said thermostat to control the refrigerating action within said refrigerant circulating conduit means, a trough for collecting water flowing down the outer wall of said container, and a conduit interconnected with the lower portion of said trough and extending downwardly in a direction to direct said collected water as a concentrated stream in heat exchange relation with said thermostat whereby said thermostat operates rapidly to initiate the refrigerating action upon starting of the flushing of said cabinet wall and container by water.

References Cited in the file of this patent
UNITED STATES PATENTS

| | | |
|---|---|---|
| 2,217,253 | Hughes | Oct. 8, 1940 |
| 2,380,901 | Chamberlain | July 31, 1945 |
| 2,509,214 | Cordis | May 30, 1950 |
| 2,690,061 | Markley | Sept. 28, 1954 |